Jan. 21, 1964 R. F. SPARROW ETAL 3,119,096
CODE RESPONSIVE SWITCHING CIRCUITS
Filed June 8, 1960 2 Sheets-Sheet 1
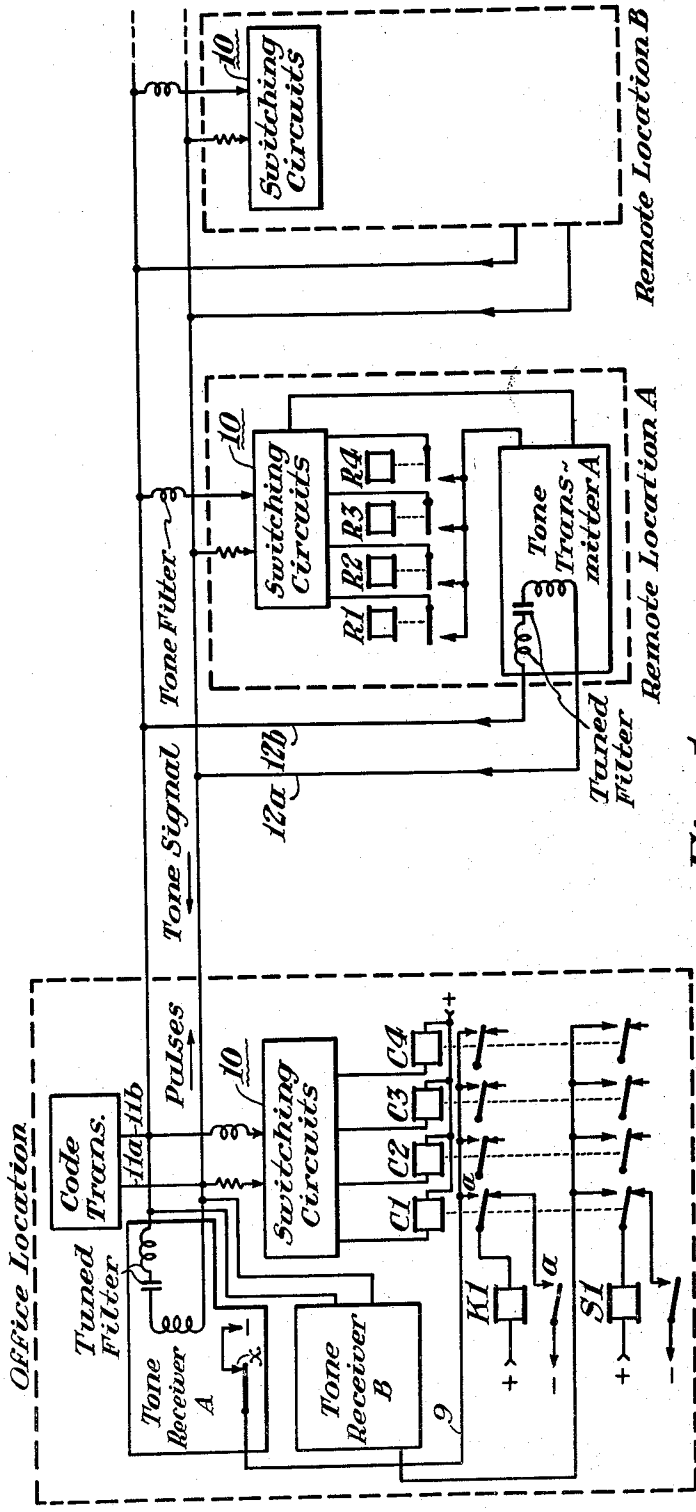
Fig. 1.
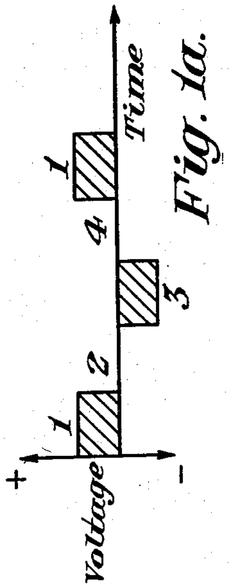
INVENTORS.
Robert F. Sparrow
and Philip H. Luft
BY
W. L. Stout
THEIR ATTORNEY

CODE RESPONSIVE SWITCHING CIRCUITS

Filed June 8, 1960 2 Sheets-Sheet 2

INVENTORS.
Robert F. Sparrow
and Philip H. Luft
BY
W. L. Stout
THEIR ATTORNEY

United States Patent Office 3,119,096
Patented Jan. 21, 1964

3,119,096
CODE RESPONSIVE SWITCHING CIRCUITS
Robert F. Sparrow, Wilkinsburg, Pa., and Philip H. Luft, Seattle, Wash., assignors to Westinghouse Air Brake Company, Wilmerding, Pa., a corporation of Pennsylvania
Filed June 8, 1960, Ser. No. 34,794
3 Claims. (Cl. 340—167)

Figure 2A:
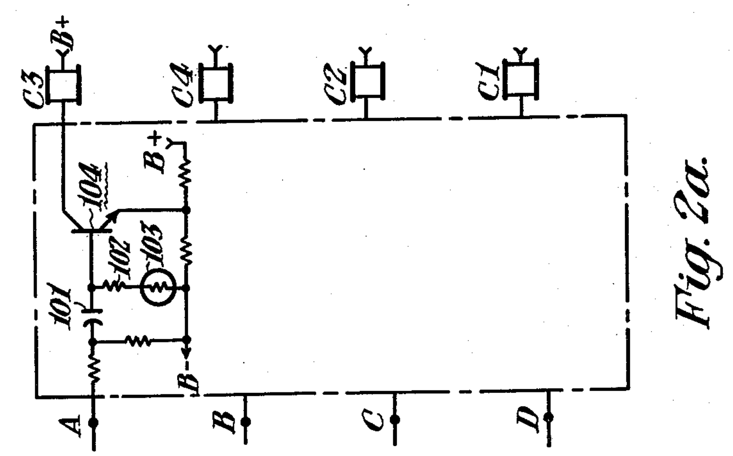

Our invention relates to switching circuits and more particularly to an electronic switching circuit for providing a plurality of distinct circuit connections.

It is a principal object of our invention to provide an electronic switching circuit for obtaining four distinct circuit connections from a source of potential to a utilization circuit in response to a code comprising a positive pulse, a time space of zero volts, a negative pulse, and a second time space of zero volts.

It is another object of our invention to provide a switching circuit of the foregoing type employing transistors.

In the attainment of the foregoing objects, we provide a switching circuit comprising a first current control device energizable to conduct and complete an electrical path from a source to a utilization circuit in response to a pulse of positive polarity. The circuit includes a bistable multivibrator which maintains first and second conducting conditions in response to pulses of positive and negative polarity respectively. A first gating means is energized to pass a signal when the multivibrator is in a first conducting condition and the first device is nonconducting to provide an electrical path from the source to the utilization circuit in response to a time space following a positive pulse. A second control device is energizable to complete an electrical path from the source to the utilization circuit in response to negative pulses. A second gating means is energized to pass a signal when the multivibrator is in a second conducting condition and the second device is nonconducting to provide an electrical path from the source to the utilization circuit in response to a time space following a negative pulse.

Figure 2:
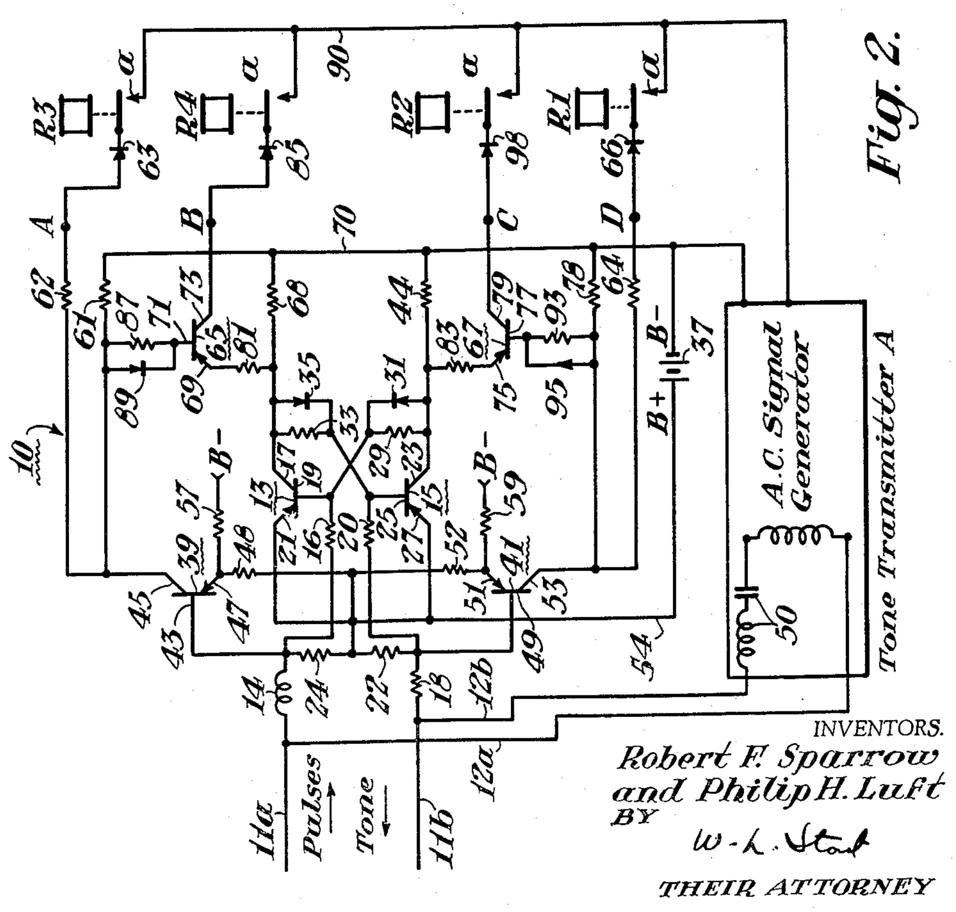

Other objects and advantages of our invention will become more apparent from the following description taken in connection with the accompanying drawings in which like reference characters refer to like elements throughout and in which:

FIG. 1 is a block diagram of a system employing switching circuits according to our invention;

FIG. 1*a* is a graph showing the code pulse to which a circuit according to our invention responds;

FIG. 2 is a schematic diagram of a switching circuit according to our invention; and FIG. 2*a* is a schematic diagram of an output circuit employed in the switching circuit located at the office location of FIG. 1.

We shall first describe an embodiment of a switching circuit according to our invention and shall then point out the novel features thereof in the appended claims.

Referring to FIG. 1, the copending application of A. B. Miller for remote indication systems, Serial No. 29,906, filed on May 18, 1960, for Remote Indication Systems, and assigned to the same assignee as the present invention discloses a continuously operating remote indication system for obtaining, at an office location, an indication of the position of as many as four devices such as mechanical railway switches at each of various remote or field locations. A code or pulse transmitting unit located at the office is connected in parallel to a switching circuit 10 at the office and to similar switching circuits 10 located at various remote or field locations by a two-wire line 11*a* and 11*b*. The code transmitting unit transmits a continuous or recycling code comprising a recycling positive pulse, a time space of zero volts, a negative pulse, and a second time space of zero volts, see FIG. 1*a*. In order to most efficiently utilize the system it is desired that each of the time spaces between the pulses be an information period so that overall code provides four distinct information periods and the condition or position of as many as four devices at each remote location can be monitored.

The switching circuit 10, according to our invention, located at the office receives the code pulses and separately switches a first C1, a second C2, a third C3 and a fourth C4 counting relay into the circuit and then repeats the cycle. The details of circuit 10 will be discussed in detail below. An identical switching circuit 10 at each remote location is energized by the code pulses to switch in synchronism with the switching circuit at the office. Each of the four distinct outputs from the switching circuit at each remote location is connected through the contacts of four respective position relays R1, R2, R3 and R4. The energization of each position relay is controlled by the position of the associated devices (say mechanical switches). For example, if a mechanical switch is in an initial position, the respective position relay is energized, and if the mechanical switch is in a reverse position, the respective position relay is deenergized.

The switching circuit at each remote location completes an electrical path through, say, the back contacts of the respective position relays to energize a tone transmitter, that is, an alternating current transmitter operating at a particular frequency. If, for example, one of the four mechanical switches at remote location A is in a reverse position, the switching circuit will energize the respective tone transmitter through the associated relay during one of the four time periods. The output signal from the tone transmitter is connected through a two-wire line 12*a*, 12*b* to line 11*a*, 11*b* and to tone receiver A which is located at the office and tuned to the operating frequency of tone transmitter A. As noted, the operation of the switching circuits at the remote locations is synchronized with that of the switching circuit at the office. When one of the tone receivers at the office is energized it provides an output which in turn energizes an indication relay (only two indication relays K1 and S1 are shown in FIG. 1), through circuits completed by that counting relay energized during the time period when the tone transmitter is transmitting a signal thereby providing a suitable visual or electrical indication of the position of the respective mechanical switch at the remote location. Each of the heel contacts of the counting relays C1, C2, C3 and C4 are connected to separate indication relays, not shown; the operation of the indication relays are all similar to that of indication relay K1 now to be described. Assume for simplicity in explanation that a contact *x* in tone receiver A located at the office closes when said receiver is receiving a signal from tone transmitter A located at remote location A. If tone transmitter A is providing an output to tone receiver A during the first information period when counting relay C1 is picked up, a circuit for energizing indication relay K1 will be completed from (+) potential, the coil of relay K1, front contact *a* of relay C1, lead 9 and the closed contact *x* to (−) potential. After relay C1 releases, indication relay K1 remains energized over a stick circuit completed from (+) potential, the coil K1, back contact *a* of relay C1 and the front contact *a* of relay K1 to (−) potential.

During the next code cycle when C1 picks up, the stick circuit will be opened; however, if contact *x* is still closed relay K1 will remain energized over the circuit previously traced.

Likewise if tone receiver A is receiving a signal from tone transmitter A during one of the other three information periods a respective indication relay will be energized.

Effectively information as to the position of each of the four mechanical switches is transmitted by the tone transmitter during a specific and different one of the four time periods provided by the code. The tone transmitter at each remote location transmits information at a particular frequency and the frequency selective receivers at the office distinguish between the various remote locations. Thus, by providing the four information periods, the position of as many as four devices at each remote location can be obtained.

In prior art circuits the spaces between the pulses provide no useful timing intervals with a consequent loss in time for processing information and loss in efficiency. This time loss is particularly critical where a large number of devices at a large number of locations must be monitored and information regarding the position or state of each device must be transmitted to a central location. Switching circuit 10 thus provides twice as many information periods as prior art devices.

In the following description, the polarity of the code pulses is considered with reference to the two input leads 11*a* and 11*b* of FIGS. 1 and 2; a positive pulse indicates that lead 11*a* is positive with respect to lead 11*b* and a negative pulse indicates that lead 11*a* is negative with respect to lead 11*b*. Circuit 10 is a balanced circuit; that is, a portion of the circuit operates in response to a negative input pulse.

The switching circuits 10 at the remote locations have slightly different output connections from the switching circuit 10 at the office. The circuits 10 at the remote locations will be described first and then the output portion of circuit 10 at the office will be described.

Circuit 10 includes a pair of PNP transistors 13 and 15, each having base, emitter and collector electrodes which are connected as a bistable multivibrator. As will be explained in more detail below, transistors 13 and 15 function as memory elements to indicate the polarity of the immediately preceding pulse coupled to circuit 10 to thereby indicate whether a time space is the second or fourth information period. The physical connections of transistors 13 and 15 are as follows: Base 19 of transistor 13 is connected through a resistor 29 to the collector 23 of transistor 15. Likewise, the base 25 of transistor 15 is connected through resistor 33 to collector 17 of transistor 13. Diodes 31 and 35 are connected in parallel to resistors 29 and 33, respectively. Diodes 31 and 35 are each connected in the circuit to be reversed in polarity, that is, to oppose normal current flow in the associated transistor. As discussed in the application for Letters Patent of the United States, Serial No. 714,720 by Thomas J. Blocher, Jr., filed February 12, 1958, for Limiter Circuit, now abandoned, diodes 31 and 35 provide temperature compensation for the transistors. Briefly, should $I_{CBO}$ (leakage collector current in transistors 13 and 15) tend to increase, it would be by-passed by respective diodes 31 and 35 and little if any voltage will be developed across resistors 29 and 33, respectively, thus preventing thermal runaway of transistors 13 and 15.

The emitter 21 of transistor 13 is connected directly to emitter 27 of transistor 15 and both emitters are connected through lead 54 to the positive terminal B+ of a source of potential shown as battery 37. Collector 17 of transistor 13 is connected through resistor 68 to the negative terminal B— of battery 37 while the collector 23 of transistor 15 is connected through a resistor 44 to negative terminal B— of battery 37.

Lead 11*a* connects through an inductor 14 connected in series with a resistor 16 to the base 19 of transistor 13 while lead 11*b* connects through two series connected resistors 18 and 20 to the base 25 of transistor 15. A pair of series resistors 22 and 24 are connected across leads 11*a* and 11*b* from the junction of inductor 14 and resistor 16, to the junction of resistors 18 and 20. The junction of resistors 22 and 24 is connected through lead 54 to B+ terminal.

Circuit 10 includes a second pair of PNP transistors 39 and 41, each having base, emitter and collector electrodes. As will be explained below, transistor 41 is energized to conduct in response to positive code pulses to thereby complete an electrical path to energize tone transmitter A during the first information period. Transistor 39 in turn is energized to conduct in response to negative code pulses to thereby indicate the third information period. The physical connections of transistors 39 and 41 are as follows: Base 43 of transistor 39 is connected to the junction of inductor 14 and resistor 16 while base 49 of transistor 41 is connected to the junction of resistors 18 and 20. Emitter 47 of transistor 39 is connected through series resistors 48 and 52 to the emitter 51 of transistor 41. Emitters 47 and 51 are also connected through respective resistors 57 and 59 to B— terminal. Resistors 57 and 59 form a divider network for placing a small amount of reverse bias on transistors 39 and 41 for obtaining better stability at high temperatures. In this respect it should be noted that in one embodiment resistors 48 and 52 each have about 2 ohms resistance while resistors 57 and 59 each have about 500 ohms resistance. The collector 45 of transistor 39 is connected through resistor 62 and diode 63 to the heel contact of relay R3. Likewise, collector 53 of transistor 41 is connected through resistor 64 and diode 66 to the heel contact of relay R1. Collectors 45 and 53 are also connected through respective resistors 61 and 78 to lead 70 and B— terminal.

Circuit 10 includes a third pair of PNP transistors 65 and 67 each having base, emitter and collector electrodes. As will be explained below, transistors 65 and 67 function as gates, transistor 67 being energized to conduct during the time space following the positive pulse and indicates the second information period; and transistor 65 being energized to conduct during the time space following the negative pulse to indicate the fourth time period. The physical connections of transistors 65 are as follows: Emitter 69 is connected through resistor 81 to the collector 17 of transistor 13; the base 71 is connected through resistor 87 to the collector 45 of transistor 39 and through resistor 61 to lead 70 and B— terminal; the collector 73 is connected through a diode 85 to the heel contact of relay R4. The physical connections of transistor 67 are as follows: Emitter 75 is connected through resistor 83 to the collector 23 of transistor 15; base 77 is connected through resistor 93 to collector 53 of transistor 41 and through a resistor 78 and lead 70 to B— terminal. Collector 79 is connected through diode 98 to the heel contact of relay R2. Diodes 89 and 95 connected in parallel with resistors 87 and 93 function similarly to diodes 31 and 35 to prevent thermal runaway of transistors 65 and 67, respectively.

The back contacts of relays R1, R2, R3 and R4 are connected through internal circuitry of the tone transmitter to B—; thus a complete circuit path is completed from B+ through one or more of the transistors 13, 15, 39, 41, 65 and 67 and the contacts of an associated relay R1, R2, R3 and R4 to energize the tone transmitter.

Diodes 63, 85, 98 and 66 connected in the collector circuits of transistors 39, 65, 67 and 41, respectively, prevent the possibility that any reverse leakage current through these transistors may undesirably energize the tone transmitter.

The operation of circuit 10 is as follows: As noted above, a complete operating cycle consists of a code providing four time periods namely, a positive pulse, a time space, a negative pulse and a second time space; a complete cycle takes approximately three seconds.

During the first time period the voltage on lead 11*a* is positive with respect to the voltage on lead 11*b* and the potential at the lower terminal of resistor 22 will be negative with respect to the potential at the upper terminal of resistor 22. Transistor 15 will thus be biased to conduction since its base 25 will be negative with respect to its emitter 27. Since the transistors 13 and 15 are connected as a bistable or flip-kop multivibrator, when transistor 15 starts conducting, transistor 13 will be cut off, that is, become nonconducting.

Transistor 41 will also be biased to conduction since its base 49 is now negative with respect to its emitter 51. Transistor 41 will, in fact, be conducting saturation current, causing its collector 53 to be at approximately B+ potential of battery 37. Since base 77 of transistor 67 is connected to collector 53, base 77 will also be approximately at B+ potential and transistor 67 will be nonconducting.

Assuming an associated mechanical switch is at a position causing relay R1 to be deenergized, back contact *a* of relay R1 will be closed and almost the entire potential of battery 37 will appear across resistor 64 and the internal circuitry in the tone transmitter A. The path for energizing the tone transmitter during the positive pulse portion of the operating cycle is from B+ terminal through lead 54, resistor 52, transistor 41, resistor 64, diode 66, back contact *a* of relay R1, the internal circuitry of the tone transmitter and thence to B− terminal. The ohmic size of resistors 52 and 64 is chosen so that the voltage division between the resistors and the one transmitter is such that adequate signal levels are obtained.

As noted, the tone transmitter provides an alternating current signal oscillating at a particular frequency. The tone transmitter is connected through leads 12*a*, 12*b* and 11*a*, 11*b* to the office location. Lead 12*a* is connected to the junction of lead 11*a* and inductor 14, that is, ahead of inductor 14 so that the reactance of inductor 14 prevents the alternating current signals from tone transmitter A from energizing the switching circuit. Likewise, a series tuned filter 50 of any suitable type is connected at the output of each tone transmitter to block the code pulses as well as the signals from the other tone transmitters from affecting the said transmitter circuitry.

During the first or positive pulse period of the operating cycle, transistors 13 and 39 are biased to be nonconducting by said positive pulse; transistor 65 is biased to be nonconducting since its emitter, base and collector are all effectively connected to B− terminal; transistor 67 is biased to be nonconducting since its base 77 is coupled through conducting transistor 41 to B+. Since transistors 13, 39, 65 and 67 are nonconducting, if any of relays R2, R3 or R4 are deenergized, i.e., their back contacts closed, the tone transmitter will not operate if contacts *a* of relay R1 are picked up. In other words, during the first time period the tone transmitter will operate only if relay R1 is deenergized and its back contact closed.

During the second time period, that is, during the time space of zero volts potential which follows the positive pulse, transistor 15 continues to conduct, this being an inherent characteristic of a bistable multivibrator. Transistor 41, however, cuts off since the negative voltage on base 49 which biased transistor 41 to conduction has been removed. However, since transistor 15 is still conducting its collector 23 is approximately at B+ potential and transistor 67 will now be biased to conduction since its emitter 75 is connected to collector 23 and B+, while its base 77 is approximately at B− potential. If relay R2 is deenergized when transistor 67 conducts, the tone transmitter will be switched on. During this portion of the operating cycle, the current path for energizing the tone transmitter is from B+ terminal through transistor 15, transistor 67, back contact *a* of relay R2, the internal circuitry of the tone transmitter and back to B−. During this second time period, the transistors 39, 41, 13 and 65 are nonconducting; hence, if any of relays R1, R3 and R4 are deenergized, the tone transmitter will not be switched on if contacts *a* of relay R2 are picked up. In other words, during the second time period the tone transmitter will be operated only if relay R2 is deenergized and its back contact closed.

During the third time period a negative pulse will be coupled to circuit 10. The potential at the upper terminal of resistor 24 will be negative with respect to the potential at the lower terminal of resistor 24. Transistor 13 will be biased to conduct since its base 19 will be negative with respect to its emitter 21. As noted above, when transistor 13 conducts it causes transistor 15 to cut off or be nonconducting. Transistor 39 will also be biased to conduct since the potential on its base 43 will be negative with respect to the potential on its emitter 47. Transistor 39 will in fact be conducting saturation current causing the potential at its collector 45 to be at approximately B+ potential. Since base 71 of transistor 65 is connected to collector 45, base 71 will also be approximately at B+ potential and transistor 65 will be nonconducting. If relay R3 is deenergized due to the positioning of its associated mechanical device, a circuit for energizing the tone transmitter will be completed from B+ through transistor 39, back contact *a* of relay R3, the internal circuitry of the tone transmitter and back to B−. During the negative pulse period of the operating cycle, transistors 15, 41, 65 and 67 are all nonconducting; hence, if any of relays R1, R2 and R4 are deenergized, the tone transmitter will not operate if contact *a* of relay R3 is picked up. In other words during the third or negative pulse period, the tone transmitter will operate only if relay R3 is deenergized and its back contacts closed. As will be appreciated, the operating condition during the third period is the same as that of the first period of the cycle except that the upper half of circuit 10 is now conducting instead of the lower half.

The fourth and last time period is provided by the second time space. Transistor 13 continues to conduct, due to multivibrator action. Transistor 39, however, cuts off since the negative voltage on its base 43 which biased it to conduct has been removed. With transistor 13 conducting and transistor 39 cut off, base 71 of transistor 65 will be at essentially B− potential, and emitter 69 of transistor 65 will be at essentially B+ potential. Transistor 65 will now be biased to conduct. If relay R4 is deenergized when transistor 65 conducts, the tone transmitter will be switched on. During this portion of the operating cycle, the current path for energizing the tone transmitter is from B+ terminal through transistor 13, transistor 65, back contact *a* of relay R4, the internal circuitry of the tone transmitter and back to B−. During this fourth time period transistors 39, 15, 41 and 67 are nonconducting; hence, if any of relays R1, R2 and R3 are deenergized, the tone transmitter will not be switched on if contact *a* of relay R4 is picked up. In other words during the fourth time period the tone transmitter will operate only if relay R4 is deenergized and its back contact closed.

The switching circuit at the office location is similar to the switching circuits in the field locations to the points indicated as A, B, C and D in FIGURE 2. At the office location instead of connecting the foregoing points to the heel contacts of the position relays R1, R2, R3 and R4, they are connected through a transistor amplifier to energize the operating coil of the respective counting relays C1, C2, C3 and C4. Switching circuit 10 causes the counting relays to be energized and pick up sequentially, that is, C1 picks up and releases, then C2 picks up and releases, etc. In order to assure that each of the relays releases before the succeeding relays picks up to thus prevent any overlapping of the indications received from the remote or field locations, an integrating circuit is connected before the transistor amplifier. Overlapping might occur since transistors operate relatively much faster than relays, and transistor circuits are used throughout the system. For example, in FIGURE 2*a* (since all the circuits in FIG. 2*a* are identical only the details of one circuit are shown) the voltage at point A is coupled through an integrating network comprising a capacitor 101 connected in series and a resistor 102 and a temperature compensating thermistor 103 connected in parallel to an NPN type transistor amplifier 104. The integrating network sharpens and in effect shortens the pulse to the transistor amplifier 104 for decreasing the time during which relay C3 is energized thus causing relay C3 to actually release before the end of the code pulse which causes it to be energized. Although we have herein shown and described only one basic form of a circuit embodying our invention, it will be understood that various changes and modifications may be made therein within the scope of the appended claims without departing from the spirit and scope of our invention.

Having thus described our invention, what we claim is:

1. A switching circuit for providing four distinct electrical paths from a source of potential to energize a utilization circuit in response to a code comprising a positive pulse, a time space of zero volts, a negative pulse, and a second time space of zero volts, said circuit comprising a first pair of transistors, means connecting the first transistor of said first pair to be conducting in response to positive pulses and the second transistor of said first pair to be conducting in response to negative pulses, a second pair of transistors connected as a multivibrator which is energized to a first conducting condition and to remain in said first condition in response to positive pulses and energized to a second conducting condition and to remain in said second condition in response to negative pulses, a third pair of transistors, the first transistor of said third pair being biased to conduct when the first transistor of said first pair is nonconducting and the first transistor of said multivibrator is conducting, the second transistor of said third pair being biased to conduct when the second transistor of said first pair is nonconducting and the second transistor of said multivibrator is conducting, whereby said switching circuit provides a first electrical path through said first transistor of said first pair in response to a positive pulse, a second electrical path through the first transistor of said multivibrator and the first transistor of said third pair during the first time space, a third electrical path through said second transistor of said first pair when in response to a negative pulse, and a fourth electrical path through said second transistor of said multivibrator and the second transistor of said third pair during the second time space.

2. A switching circuit for providing four distinct electrical paths from a biasing and operating source of potential to energize a utilization circuit in response to a code comprising a positive pulse, a time space of zero volts, a negative pulse, and a second time space of zero volts, said circuit comprising three pairs of PNP type transistors, each transistor including base, emitter and collector electrodes, a first and second input lead for coupling said code pulses to said transistors, the polarity of said code pulses referring to the relative voltage on said first input lead with respect to the voltage on said second input lead, the bases of the first and second transistors of said first pair being connected to said first and second input leads respectively, the first and second transistors of said first pair being conductive in response to positive and negative pulses respectively, the second pair of transistors being connected as a bistable multivibrator, the bases of the first and second transistors of said multivibrator being connected to said second and first input leads respectively, the base and emitter of the first transistor of said third pair being connected to the collector of the first transistor of said first pair and to the collector of the first transistor of said multivibrator respectively, whereby the first transistor of said third pair is biased to conduction only when the first transistor of said first pair is nonconducting and the first transistor of said multivibrator is conducting, the base and emitter of the second transistor of said third pair being connected to the collector of the second transistor and to the collector of the second transistor of said multivibrator respectively, whereby said second transistor of said third pair is biased to conduction only when said second transistor of said first pair is nonconducting and the second transistor of said multivibrator is conducting, the utilization circuit being connected to the collectors of each of the transistors of said first and third pairs, whereby a first electrical path for energizing the utilization circuit from said source is provided through the first transistor of said first pair in response to positive pulses, a second electrical path is provided through said first transistor of said multivibrator pair and the first transistor of said third pair during the first time space, a third electrical path is provided through said second transistor of said first pair in response to negative pulses, and a fourth electrical path is provided through said second transistor of said multivibrator pair and the second transistor of said third pair during the second time space.

3. A switching circuit for providing four distinct circuit connections from a source of potential to a utilization circuit in response to a code comprising a positive pulse, a time space of zero volts, a negative pulse, and a second time space of zero volts, said circuit comprising a plurality of transistors, first and second input leads for coupling said code pulses to said transistors, the polarity of said code pulses referring to the relative potential of the voltage on said first lead with respect to the voltage on said second lead, the first of said transistors being connected to said second lead and being biased to conduct only in response to positive pulses, said first transistor when conducting providing a first electrical path from the source to energize the utilization circuit, a second of said transistors being connected to said first lead and being biased to conduct only in response to negative pulses, a third and fourth of said transistors connected as a bistable multivibrator, said third and fourth transistors being connected to said second lead and first lead respectively, said third transistor being biased to conduct in response to negative pulses and said fourth transistor being biased to conduct in response to positive pulses, fifth and sixth transistors connected as gates, said fifth transistor being connected to be biased by said first and third transistors, said fifth transistor being biased to conduct when said first transistor is nonconducting and said third transistor is conducting, said sixth transistor being connected to be biased by said second and fourth transistors, said sixth transistor being biased to conduct when said second transistor is nonconducting and said fourth transistor is conducting, whereby a second electrical path is provided from the source through said third and fifth transistors for energizing said utilization circuit in response to a time space preceded by a positive pulse, a third electrical path is provided from the source through said second transistor in response to negative pulses, and a fourth electrical path is provided from said source through said fourth and sixth transistors for energizing said utilization circuit in response to a time space preceded by a negative pulse.

References Cited in the file of this patent

UNITED STATES PATENTS 2,512,639 Gohorel ---------------- June 27, 1950